United States Patent [19]

Ball et al.

[11] Patent Number: 6,063,865

[45] Date of Patent: May 16, 2000

[54] CROSSLINKABLE POWDER COMPOSITION WHICH IS REDISPERSIBLE IN WATER

[75] Inventors: Peter Ball, Emmerting; Herbert Eck, Bad Toelz, both of Germany

[73] Assignee: Wacker-Chemie GmbH, Munich, Germany

[21] Appl. No.: 09/126,675

[22] Filed: Jul. 30, 1998

[30] Foreign Application Priority Data

Jul. 31, 1997 [DE] Germany .............. 197 33 104

[51] Int. Cl.$^7$ .................................. C08G 63/48
[52] U.S. Cl. ............................ 525/57; 524/503
[58] Field of Search ................ 524/503; 525/57

[56] References Cited

U.S. PATENT DOCUMENTS

| | | |
|---|---|---|
| 3,409,578 | 11/1968 | Hwa . |
| 4,210,565 | 7/1980 | Emmons ........................ 260/29.6 |
| 5,608,011 | 3/1997 | Eck et al. . |
| 5,668,216 | 9/1997 | Kinkel et al. . |

FOREIGN PATENT DOCUMENTS

| | | |
|---|---|---|
| 0601518 | 6/1994 | European Pat. Off. . |
| 0721004 | 7/1996 | European Pat. Off. . |
| 0723975 | 7/1996 | European Pat. Off. . |
| 0687317 | 11/1996 | European Pat. Off. . |
| 0702059 | 12/1996 | European Pat. Off. . |

OTHER PUBLICATIONS

Derwent Abstract corr. to JP 52 069937 A AN 77–52863 Y.

*Primary Examiner*—Paul R. Michl
*Attorney, Agent, or Firm*—Burgess, Ryan & Wayne

[57] ABSTRACT

A crosslinkable powder composition is provided which is redispersible in water and comprises a) from 30 to 95 parts by weight of one or more water-insoluble, film-forming polymers of free-radically polymerizable, ethylenically unsaturated monomers, where from 0.5 to 10% by weight of the monomers, based on the total weight of the polymer a), are ones having one or more substituents selected from the group consisting of aldehyde, keto, epoxide, isocyanate, carboxylic anhydride and aziridine groups, b) from 5 to 70 parts by weight of one or more water-soluble, film-forming polymers, where the parts by weight of a) and b) add up to 100 parts by weight, and c) one or more compounds containing at least two functional groups which are present in salt form and are selected from the group consisting of amines, hydrazides, hydroxylamine esters, aryl- and alkylhydrazines or -hydrazones.

9 Claims, No Drawings

CROSSLINKABLE POWDER COMPOSITION WHICH IS REDISPERSIBLE IN WATER

BACKGROUND OF THE INVENTION

1. Field of the Invention

The invention relates to a crosslinkable powder composition which is redispersible in water and also to its use.

2. Background Art

EP-A 601518 describes crosslinkable dispersion powders which are redispersible in water and based on carboxyl-containing acrylate copolymers which are dried in the presence of polyvinyl alcohol and can contain polyvalent metal ions for crosslinking. Similar crosslinkable dispersion powders are also known from U.S. Pat. No. 3,409,578 in which powder compositions comprising carboxyl-containing polymers and/or carboxyl-containing protective colloids are crosslinked in the presence of polyvalent metal ions. A disadvantage is that such compositions comprising polyvalent metal salts which liberate acid in the presence of water tend to crosslink prematurely, especially in contact with moisture.

To avoid premature crosssslinking, EP-A 702059 (U.S. Pat. No. 5,608,011) proposes using crosslinkable dispersion powders comprising N-methylol-containing copolymers and a catalyst combination of water-soluble or water-dispersible peroxo acid salts or reducing agents. EP-B 687317 describes crosslinkable powders which are redispersible in water and are based on N-methylol-functional copolymers which crosslink on heating. A disadvantage of the latter powder is the fact that exclusively heat-crosslinkable powders cannot be used in many applications.

EP-A 723975 discloses crosslinkable dispersion powders based on copolymers containing epoxide groups. For crosslinking, external crosslinkers such as polyamines, polycarboxylic acids, hydroxy-functionalized polymers and polyvalent metal salts are added. A problem with the use of polyamines or polyvalent metal salts is the low storage stability. The use of polycarboxylic acids or hydroxy-functionalized polymers does not impair the storage stability; however, elevated temperatures have to be employed for the reaction with the epoxy groups since otherwise the stabilization indicated in the application of the dispersion powders using customary protective colloids would not be possible.

EP-A 721004 discloses crosslinkable, redispersible powder mixtures comprising film-forming polymer particles having at least one functional, crosslinkable group. In this document too, it is recommended that crosslinking be carried out by addition of an external crosslinker which is soluble or dispersible in water and comprises at least one reactive component which forms nonionic bonds with the functional groups after the mixture is redispersed in water. The crosslinker component can be a water-soluble or emulsifiable monomer or polymer, or else a pulverulent mixture of the crosslinker and an inorganic carrier such as $CaCO_3$, clay or silicon dioxide. The crosslinker component is bound to these carrier substances by physical adsorption. This has the disadvantage that these mixtures have the same odor, if somewhat attenuated, as the pure crosslinker component. In addition, owing to the weak physical bonding, the crosslinker component can become detached and penetrate into the polymer to be crosslinked, which, particularly in the case of very reactive substances, can lead to a reduced shelf life or premature crosslinking. This applies particularly when the protective colloid component has functional groups.

It is an object of the invention to provide a crosslinkable, film-forming polymer powder which is dispersible in water and has good storage stability, blocking resistance and is free-flowing.

SUMMARY OF THE INVENTION

The invention provides a crosslinkable powder composition which is redispersible in water and comprises a) from 30 to 95 parts by weight of one or more water-insoluble, film-forming polymers of free-radically polymerizable, ethylenically unsaturated monomers, where from 0.5 to 10% by weight of the monomers, based on the total weight of the polymer a), are ones having one or more substituents selected from the group consisting of aldehyde, keto, epoxide, isocyanate, carboxylic anhydride and aziridine groups, b) from 5 to 70 parts by weight of one or more water-soluble polymers, where the parts by weight of a) and b) add up to 100 parts by weight, and c) one or more compounds containing at least two functional groups which are present in salt form and are selected from the group consisting of amines, hydrazides, hydroxylamine esters, aryl- and alkylhydrazines or -hydrazones.

DESCRIPTION OF THE PREFERRED EMBODIMENTS

Suitable water-insoluble polymers comprise one or more monomer units selected from the group consisting of vinyl esters of unbranched or branched alkylcarboxylic acids having from 1 to 15 carbon atoms, methacrylic and acrylic esters of unbranched or branched alcohols having from 1 to 12 carbon atoms, fumaric and maleic monoesters or diesters of unbranched or branched alcohols having from 1 to 12 carbon atoms, dienes such as butadiene or isoprene, olefins such as ethene or propene, vinylaromatics such as styrene, methylstyrene or vinyltoluene, and vinyl halides such as vinyl chloride. For the purposes of the present invention, water-insoluble means that the solubility of the polymers under normal conditions is less than 1 g per liter of water. For film formation, the polymer composition is generally selected such that film formation occurs at the processing temperature, preferably such that a glass transition temperature Tg of from $-30°$ C. to $+80°$ C. results.

Preferred vinyl esters are vinyl acetate, vinyl propionate, vinyl butyrate, vinyl 2-ethylhexanoate, vinyl laurate, 1-methylvinyl acetate, vinylpivalate and vinyl esters of alpha-branched monocarboxylic acids having from 5 to 11 carbon atoms, for example VeoVa09® or VeoVa10® (trade names of Shell). Particular preference is given to vinyl acetate.

Preferred methacrylic or acrylic esters are methyl acrylate, methyl methacrylate, ethyl acrylate, ethyl methacrylate, propyl acrylate, propyl methacrylate, n-butyl acrylate, t-butyl acrylate, n-butyl methacrylate, t-butyl methacrylate, 2-ethylhexyl acrylate. Particular preference is given to methyl acrylate, methyl methacrylate, n-butyl acrylate and 2-ethylhexyl acrylate.

Preferred ester groups for fumaric and maleic acids are methyl, ethyl, n-propyl, iso-propyl, n-butyl, isobutyl, t-butyl, hexyl, ethylhexyl and dodecyl groups.

The polymer a) can further comprise from 0.05 to 10.0% by weight, based on the total weight of the polymer a), of auxiliary monomers selected from the group consisting of ethylenically unsaturated monocarboxylic and dicarboxylic acids and their amides, e.g. acrylic acid, methacrylic acid, maleic acid, fumaric acid, itaconic acid, acrylamide, methacrylamide; ethylenically unsaturated sulfonic acids or their salts, preferably vinylsulfonic acid, 2-acrylamidopropanesulfonate and/or N-vinylpyrrolidone.

Further examples of auxiliary monomers are hydrophobicizing and condensation-crosslinking alkoxysilane-functional monomer units such as acryloxypropyltri(alkoxy) silanes and methacryloxypropyltri(alkoxy)silanes, vinyltrialkoxysilanes and vinylmethyldialkoxysilanes; alkoxy groups which may be present are, for example, methoxy, ethoxy, methoxyethylene, ethoxyethylene, methoxypropylene glycol ether and ethoxypropylene glycol ether radicals. Preference is given to vinyltriethoxysilane and gammamethacryloxypropyltriethoxysilane.

Further examples of auxiliary monomers are additional crosslinkers such as acrylamidoglycolic acid (AGA), methyl methacrylamidoglycolate (MMAG), N-methylolacrylamide (NMAA), N-methylolmethacrylamide, N-methylolallyl carbamate, alkyl ethers of N-methylolacrylamide or N-methylolmethacrylamide, and their isobutoxy ethers or n-butoxy ethers.

Other suitable auxiliary monomers are multiply ethylenically unsaturated comonomers such as ethylene glycol diacrylate, 1,3-butylene glycol diacrylate, 1,4-butylene glycol diacrylate, propylene glycol diacrylate, divinyl adipate, divinylbenzene, vinyl methacrylate, vinyl acrylate, allyl methacrylate, allyl acrylate, diallyl maleate, diallyl phthalate, diallyl fumarate, methylenebisacrylamide, cyclopentadienyl acrylate or triallyl cyanurate.

Preference is given to copolymerizing from 1 to 5% by weight of comonomers having one or more substituents selected from the group consisting of aldehyde, keto, epoxide, isocyanate, carboxylic anhydride and aziridine groups.

Suitable monomers containing aldehyde and keto groups are acrolein, vinyl methyl ketone, allyl acetoacetate, vinyl acetoacetate, vinyl or allyl bisacetoacetate and acetoacetylated hydroxyalkyl (meth)acrylates. Suitable monomers containing epoxy groups are glycidyl acrylate, glycidyl methacrylate, glycidyl vinyl ether and glycidyl allyl ether. Examples of isocyanates are meta- and para-isopropenyl-alpha, alpha-dimethylbenzyl isocyanate (TMI), 2-methyl-2-isocyanatopropyl methacrylate, where the isocyanate groups of the monomers mentioned may, if desired, also be blocked, for example by means of phenol, salicylic esters, ketoxime, caprolactam, dialkyl malonates, alkyl acetoacetates, 2,2-dimethyl-1,3-dioxane-4,6-dione. Examples of anhydride comonomers are allylsuccinic anhydride and maleic anhydride.

Preferred crosslinkable monomer units are glycidyl (meth)acrylate, meta- and para-isopropenyl-alpha, alpha-dimethylbenzyl isocyanate (TMI), allyl acetoacetate, unmodified or acetoacetylated hydroxyethyl (meth)acrylate or hydroxypropyl (meth)acrylate.

As polymers a) which comprise the crosslinkable comonomer units mentioned in the amounts indicated, preference is given to:

from the group consisting of vinyl ester polymers vinyl acetate polymers;

vinyl acetate-ethylene copolymers having an ethylene content of from 1 to 60% by weight;

vinyl ester-ethylene-vinyl chloride copolymers having an ethylene content of from 1 to 40% by weight and a vinyl chloride content of from 20 to 90% by weight in which vinyl esters present are preferably vinyl acetate and/or vinyl propionate and/or one or more copolymerizable vinyl esters such as vinyl laurate, vinyl pivalate, vinyl 2-ethylhexanoate, vinyl esters of an alpha-branched carboxylic acid, in particular the vinyl ester of Versatic acid;

vinyl acetate copolymers with from 1 to 50% by weight of one or more copolymerizable vinyl esters such as vinyl laurate, vinyl pivalate, vinyl 2-ethylhexanoate, vinyl esters of an alpha-branched carboxylic acid, in particular vinyl esters of Versatic acid (VeoVa9®, VeoVa10®), which may further comprise from 1 to 40% by weight of ethylene;

vinyl ester-acrylic ester copolymers comprising from 30 to 90% by weight of vinyl ester, in particular vinyl acetate, and from 1 to 60% by weight of acrylic ester, in particular n-butyl acrylate or 2-ethylhexyl acrylate, which may further comprise from 1 to 40% by weight of ethylene;

vinyl ester-acrylic ester copolymers comprising from 30 to 75% by weight of vinyl acetate, from 1 to 30% by weight of vinyl laurate or a vinyl ester of an alpha-branched carboxylic acid, in particular the vinyl ester of versatic acid, from 1 to 30% by weight of acrylic ester, in particular n-butyl acrylate or 2-ethylhexyl acrylate, which may further comprise from 1 to 40% by weight of ethylene;

vinyl ester copolymers with esters of maleic acid or fumaric acid, e.g. the diisopropyl, di-n-butyl, di-t-butyl, di(ethylhexyl) and methyl t-butyl esters, for example vinyl acetate copolymers with from 10 to 60% by weight of one or more of the maleic/fumaric esters mentioned, which may further comprise ethylene or further copolymerizable vinyl esters such as vinyl laurate or the vinyl ester of versatic acid.

From the group consisting of meth)acrylic polymers polymers of n-butyl acrylate or 2-ethylhexyl acrylate; copolymers of methyl methacrylate with n-butyl acrylate and/or 2-ethylhexyl acrylate are preferred.

From the group consisting of vinyl chloride polymers, apart from the abovementioned vinyl ester-ethylene-vinyl chloride copolymers, vinyl chloride-ethylene copolymers and vinyl chloride-acrylate copolymers are preferred.

From the group consisting of styrene polymers styrene-butadiene copolymers and styrene-acrylic ester copolymers such as styrene-n-butyl acrylate or styrene-2-ethylhexyl acrylate, each having a styrene content of from 1 to 70% by weight are preferred.

Suitable water-soluble polymers b) are water-soluble protective colloids which are used for the polymerization of the polymer a) or for spray drying of the aqueous dispersions of polymer a). For the purposes of the present invention, water-soluble means that the solubility under normal conditions is more than 10 g per liter of water. Suitable protective colloids are commercially available. Examples of suitable protective colloids are polyvinyl alcohols containing from 75 to 100 mol %, preferably from 78 to 95 mol %, of vinyl alcohol units and having a molecular weight of preferably from 5000 to 200000; polyvinylpyrrolidones having a K value of from 10 to 120; polysaccharides in water-soluble form, e.g. starches (amylose and amylopectin), celluloses and their carboxymethyl, methyl, hydroxyethyl and hydroxypropyl derivatives; proteins such as casein, soya protein, gelatin; lignosulfonates; synthetic polymers such as poly(meth)acrylic acid, poly(meth)

acrylamide, polyvinylsulfonic acids and their water-soluble copolymers; melamine-formaldehyde sulfonates, naphthalene-formaldehyde sulfonates, styrene-maleic acid and vinyl ether-maleic acid copolymers.

Suitable blocked crosslinkers c) are low molecular weight and high molecular weight, organic compounds which are either in solid form or are converted into solid form, for example by adsorption on a solid prior to addition to the powder composition. Examples of crosslinkers c) are the salts of diamines and polyamines which are used in free form as crosslinkers in the prior art.

Suitable diamines and polyamines are mentioned in Houben-Weyl, Volume E20, part 3, pp. 1965–1976, for example hexamethylenediamine, diaminotetramethylcyclohexane, 1,3-bis(aminomethyl) benzene, triethylenetriamine, tetraethylenetetramine, polyethylenamine, polyoxyalkylenamines such as polyoxyethylenamine. Examples of hydrazides are carbodihydrazide and the dihydrazides of aliphatic and alicyclic dicarboxylic acids and of hexahydroterephthalic acid. Also suitable are hydrazine and aryl- and alkylhydrazines or -hydrazones such as N,N'-dimethylhydrazine and the bishydrazones of glutaraldehyde and terephthalaldehyde, and also hydroxylamine esters. The compounds mentioned can be converted into their salts in a known manner by reaction with the appropriate acids.

Suitable acid anions are the anions of all known organic and inorganic protic acids which form stable salts with the abovementioned amine compounds under the customary storage conditions. Examples which may be mentioned are: HF, HCl, $H_2SO_4$, $H_3PO_4$, phosphonic acids, carbonic acid, formic and acetic acids, and also fatty acids which, after being split off, additionally hydrophobicize the building material, for example saturated or unsaturated, branched or unbranched $C_{10}$–$C_{18}$-carboxylic acids such as lauric acid, myristic acid, stearic acid. The crosslinker salts can be water-soluble, emulsifiable or water-insoluble. Preference is given to crosslinker salts which are soluble or emulsifiable in water.

Preference is given to the halides, in particular fluorides, sulfates, phosphates, carbonates, acetates and formates of hexamethylenediamine, triethylenetetramine, carbodihydrazide and of the dihydrazides of aliphatic and alicyclic dicarboxylic acids or of hexahydroterephthalic acid, for example adipic acid dihydrazide.

These salts can be added individually or in a mixture and the amount added is calculated from the functional groups in the polymer to be crosslinked. Per functional group in the polymer a), from 0.1 to 10, preferably from 0.5 to 2, particularly preferably from 0.8 to 1.2, mol equivalents of the nitrogen compounds are mixed in.

The water-insoluble polymers a) are preferably prepared using the emulsion polymerization process. This is carried out in an open reaction vessel or in pressure vessels in a temperature range from 0° C. to 100° C. and is initiated using the methods customarily employed for emulsion polymerization. Initiation is carried out by means of the customary, at least partially water-soluble free-radical formers which are preferably used in amounts of from 0.01 to 3.0% by weight, based on the total weight of the monomers. Examples are sodium persulfate, hydrogen peroxide, t-butyl peroxide, t-butyl hydroperoxide; potassium peroxodiphosphate, azobisisobutyronitrile. If desired, the free-radical initiators mentioned can also be combined in a known manner with from 0.01 to 0.5% by weight of reducing agents, based on the total weight of the monomers. Suitable reducing agents are, for example, alkali metal formaldehydesulfoxylates and ascorbic acid. In the redox initiation, one or both redox catalyst components are preferably metered in during the polymerization.

As dispersants, it is possible to use all emulsifiers customarily employed in emulsion polymerization. Suitable emulsifiers include anionic, cationic and also nonionic emulsifiers. The emulsifiers are preferably used in an amount of up to 6% by weight, based on the total weight of the monomers. Examples of suitable emulsifiers are anionic surfactants such as alkyl sulfates having a chain length of from 8 to 18 carbon atoms, alkyl ether sulfates and alkylaryl ether sulfates having from 8 to 18 carbon atoms in the hydrophobic radical and up to 40 ethylene oxide or propylene oxide units, alkylsulfonates or alkylarylsulfonates having from 8 to 18 carbon atoms, diesters and monoesters of sulfosuccinic acid with monohydric alcohols or alkylphenols. Suitable nonionic surfactants are, for example, alkyl polyglycol ethers or alkylaryl polyglycol ethers having from 8 to 40 ethylene oxide units.

The preparation is preferably carried out in the presence of the abovementioned protective colloids. The pH range desired for the polymerization, which is generally from 2.5 to 10, preferably from 3 to 8, can be set in a known manner by means of acids, bases and customary buffer salts such as alkali metal phosphates or alkali metal carbonates. To set the molecular weight, the customary regulators, for example mercaptans, aldehydes and chlorinated hydrocarbons, can be added in the polymerization.

The polymerization can, regardless of the polymerization process selected, be carried out batchwise or continuously, with or without use of seed latices, with initial charging of all or some constituents of the reaction mixture, or with partial initial charging and further metering in of some or all constituents of the reaction mixture, or by the feed stream addition process without an initial charge. The solids content of the dispersion obtainable in this way is from 20 to 60%. The mean particle size is from 0.1 to 10 $\mu$m, preferably from 0.2 to 5 $\mu$m.

The drying of the dispersion can be carried out by means of spray drying, freeze drying or fluidized-bed drying. Preference is given to spray drying in customary spray drying units, where atomization can be carried out by means of single-fluid, two-fluid or multifluid nozzles or using a rotary atomizer disk. The outlet temperature is generally selected so as to be in the range from 55° C. to 100° C., preferably from 65° C. to 90° C., depending on the unit, the Tg of the resin and the desired degree of drying.

For spray drying, the dispersion of the polymer a) having a solids content of preferably from 20% to 60% is sprayed together with protective colloids as spraying aid and dried. Protective colloids used here can be the abovementioned water-soluble polymers b) and can be added to the aqueous dispersion before spray drying, in the form of an aqueous solution. In this process step, preference is given to adding from 5 to 20% by weight of water-soluble polymer b), based on polymer a).

The nitrogen compounds c) which are in salt form are mixed in before or after drying, in the case of the preferred spray drying, for example, at the lower end of the spray dryer or in a separate apparatus. If desired as a mixture with these crosslinkers, other additives may be added to the powder mixture.

Examples of additives for modification are antiblocking agents, dyes, pigments, plasticizers, film-formation aids, antifoams, catalysts, rheology improvers, thickeners, coupling agents and emulsifiers; if these are liquid in the original state, they have to be converted into a pulverulent state before being mixed in.

The dispersion powder composition can be used in typical fields of application. A prerequisite is the presence of alkaline materials which set the N compounds free from their salts, or the possibility of employing elevated temperatures to dissociate the salts. In the latter case, the salts of carboxylic acids and carbonic acid are preferred. Examples of applications are those in chemical building products in combination with inorganic, hydraulic binders such as cements (Portland, alumina, pozzolanaic, slag, magnesia or phosphate cement), plaster of Paris, water glass, for the production of building adhesives, plasters and renders, knifing fillers, screeds, jointing mortars and paints. It can also be used as sole binder for coating compositions and adhesives or as binder for textiles and paper. The dispersion powder composition is preferably used as binder in fields of application in which not only good adhesion but also reduced water absorption and/or good solvent resistance are desired.

The redispersion powders of the invention are products which redisperse readily in water and form mechanically strong, crosslinked films when employed in powder form or as aqueous dispersion. The use of the compounds mentioned under c) in salt form offers the advantage that the crosslinking reaction occurs only after addition of a base or after dissociation of the salts at an appropriately high temperature. The degree of crosslinking achieved with them is good, the storage stability of the powder mixtures is likewise good owing to the block of the crosslinkers in solid form. In addition, these crosslinkers generally improve the flowability of the mixtures. Particularly in many applications in the building sector, this powder composition is very advantageous since the carbonates and hydroxides ($Ca(OH)_2$) present in many formulations and ready-to-use mixtures of building materials can be mixed in the dry state with these binders and do not cause crosslinking even after prolonged storage.

The following examples illustrate the invention:

EXAMPLE 1

A 16 l stirring autoclave was charged with 3420 g of water, 352 g of polyvinyl alcohol having a Höppler viscosity of 4 mPas (4% strength solution in water at 20° C.) and a saponification number of 140, 50 g of dodecylbenzenesulfonate (15% strength in water), 510 g of vinyl acetate and 200 g of ethylene and the mixture was heated to 50° C. The catalyst solutions, a 6% strength aqueous solution of sodium persulfate and a 3% strength aqueous solution of sodium formaldehydesulfoxylate, were then fed in. After the polymerization had started, the monomer feed stream comprising 2800 g of vinyl acetate and 120 g of glycidyl methacrylate was fed in. During the polymerization, a further 800 g of ethylene were injected. After the metering-in time of about 5 hours, polymerization was continued for another 2 hours.

The solids content of the dispersion was 51%. The polymer had a K value of 74.5, a $T_g$ of 4° C. and an MFT of 0° C.

Before spraying, 8.1% by weight, based on polymer, of polyvinyl alcohol having a Höppler viscosity of 13 mPas (4% strength solution in water at 20° C.) and a saponification number of 140, plus 0.8% by weight, based on polymer, of polyvinyl alcohol having a Höppler viscosity of 5 mPas (4% strength solution in water at 20° C.) and a saponification number of 140 were added in the form of aqueous solutions. The solids content of the mixture to be sprayed was 35% by weight. Drying was carried out in a Nubilosa spray dryer at an outlet temperature of 82° C. and a compressed air pressure upstream of the 2-fluid nozzle of 4 bar.

EXAMPLE 2

A 16 l stirring autoclave was charged with 2000 g of water and 487 g of polyvinyl alcohol having a Höppler viscosity of 4 mPas (4% strength solution in water at 20° C.) and a saponfication number of 140, the mixture was heated to 50° C. and ethylene was injected to a pressure of 60 bar. This pressure was maintained during the entire time over which the monomers were metered in. The catalyst feed streams, a 2.6% strength aqueous solution of t-butyl hydroperoxide and a 4.5% strength aqueous sodium formaldehydesulfoxylate solution, were fed in simultaneously with the monomer feed stream. The monomer solution consisted of 4563 g of vinyl chloride, 1950 g of vinyl acetate and 200 g of glycidyl acrylate. After the reaction had started, a solution of 667 g of polyvinyl alcohol having a Höppler viscosity of 4 mPas (4% strength solution in water at 20° C.) and a saponfication number of 140 in 3937 g of water was metered in over a period of from 6 to 7 hours. The period over which the monomer mixture was metered in was 8 h. After the metering-in was complete, polymerization was continued for another 2 hours. The solids content was 50.2%. The $T_g$ of the polymer was 13.5° C.

Before spraying, 8.1% by weight; based on polymer, of polyvinyl alcohol having a Höppler viscosity of 13 mPas (4% strength solution in water at 20° C.) and a saponification number of 140, plus 0.8% by weight, based on polymer, of polyvinyl alcohol having a Höppler viscosity of 5 mPas (4% strength solution in water at 20° C.) and a saponification number of 140 were added in the form of aqueous solutions. Drying was carried out as in Example 1 in a Nubilosa spray dryer.

EXAMPLE 3

Polymerization and spraying were carried out using a method similar to Example 1, except that 120 g of allyl acetoacetate were used in place of 120 g of glycidyl methacrylate. The dispersion obtained had a solids content of 50.3%. The polymer had a K value of 82.9, a $T_g$ of 1° C. and an MFT of 0° C.

Before spraying, 8.1% by weight, based on polymer, of polyvinyl alcohol having a Höppler viscosity of 13 mPas (4% strength solution in water at 20° C.) and a saponification number of 140 were added in the form of an 11% strength aqueous solution. Drying was carried out using a method similar to Example 1.

EXAMPLE 4

A solution of 77.5 g of polyvinyl alcohol having a Höppler viscosity of 4 mPas (4% strength solution in water at 20° C.) and a saponfication number of 140 in 706 g of water was placed in a 2.5 l stirred vessel and 120.6 g of a 1:1 mixture (w/w) of styrene and butyl acrylate was preemulsified therein. After heating the emulsion to 50° C., a 4.9% strength aqueous t-butyl hydroperoxide solution, an 8.3% strength aqueous ascorbic acid solution and 406 g of a 1:1 mixture (w/w) of styrene and butyl acrylate in which 23.5 g of meta-isopropenyldimethylbenzyl isocyanate had been dissolved were metered in simultaneously. After 2 hours, the feeding-in of the monomers was complete. Further polymerization was carried out using a 10% strength $H_2O_2$ solution. The dispersion had a solids content of 50.4% and a pH of 5.0.

Before spraying, 6% by weight of polyvinyl alcohol having a Höppler viscosity of 4 mPas (4% strength solution in water at 20° C.) and a saponfication number of 140 in the form of a 20% strength, aqueous solution were added to the dispersion and the mixture was diluted to 30% with water.

Spraying was carried out using a method similar to Example 1.

Determination of the degree of crosslinking:

A film sample dried at room temperature was heated at 170° C. in a solvent suitable for the uncrosslinked sample, generally dimethylformamide, for 5 minutes in a microwave oven.

Evaluation was carried out by determining the solids content of the sieved liquid $$\text{Degree of crosslinking (\%)} = \frac{\text{measured solids content}}{\text{theoretical solids content}} - 1 \times 100$$

Determination of the blocking resistance:

To determine the blocking resistance, the dispersion powder was introduced into an iron tube provided with a screw cap and was then compressed with a metal punch. After compression, the tube and powder were stored at 50° C. for 16 hours in a drying oven. After cooling to room temperature, the powder was taken from the tube and the blocking resistance was determined qualitatively by crushing the powder.

The blocking resistance was classified as follows:

A=blocking resistant
B=moderately blocking resistant
C=not blocking resistant.

Determination of the redispersibility of the films:

To determine the degree of crosslinking of the films, a drop of water was applied to each of the films produced using the redispersion and the redispersibility of the films was determined after 60 seconds by rubbing with the fingertip.

Evaluation of the film redispersibility:

Grade 1: very readily redispersible Film can be redispersed immediately by very light rubbing or redisperses spontaneously.

Grade 2: readily redispersible Film can be readily redispersed by rubbing; pieces of film are possible, but are few and very easily redispersible between the fingers.

Grade 3: somewhat redispersible Film can be redispersed only by vigorous rubbing; substrate is reached only slowly with destruction of film (pieces of film); pieces of film not redispersible.

Grade 4: not redispersible Film cannot be redispersed even by prolonged vigorous rubbing; film breaks up into pieces of film without redispersing or becomes detached from the substrate.

The results of testing are summarized in the Table below:

The examples show that the compositions of the invention only become active when employed in a basic medium, so that there is no need to fear premature crosslinking with impairment of the storage stability. As a comparison, the powder from Example 4 was tested using a crosslinker which was not in the form of a salt. The degree of crosslinking obtained in that way is lower than that which results when using the composition of the invention. Furthermore, the block resistance of the powder composition is also worsened.

TABLE

| Mixture | Degree of crosslinking (%) | Blocking resistance | Redispersibility |
|---|---|---|---|
| Example 1 (disp.) + HMDAP[1] | 10.5 | — | 1 |
| Example 1 (disp.) + HMDAP[1] + 10% ML | 30.5 | — | 3–4 |
| Example 1 (powder) + HMDAP[1] | 14.0 | A | 1 |
| Example 1 (powder) + 10% ML + HMDAP[1] | 55.0 | A | 3–4 |
| Example 2 (powder) + ASDHA[2] | 21.5 | A | 1–2 |
| Example 2 + 10% ML + ASDHA[2] | 63.5 | A | 3–4 |
| Example 3 (powder) + HMDAP[1] | 17.8 | A | 1–2 |
| Example 3 + 10% ML + HMDAP[1] | 57.3 | A | 3 |
| Example 4 (powder) | 27.8 | A | 1–2 |
| Example 4 + 10% ML + HMDAP[1] | 90.4 | A | 4 |
| Example 4 + 0.5% HMM[3] | 45.6 | B | 2–3 |

ML: milk of lime
[1]HMDAP: phosphoric acid salt of hexamethylenediamine; ratio of the reactive groups = 1:1.2
[2]ASDHA: acetic acid salt of adipic acid dihydrazide; ratio of the reactive groups = 1:1
[3]HMM: hexamethylenediamine

What is claimed is:

1. A crosslinkable powder composition which is redispersible in water and comprises
   a) from 30 to 95 parts by weight of one or more water-insoluble, film-forming polymers of free-radically polymerizable, ethylenically unsaturated monomers, where from 0.5 to 10% by weight of the monomers, based on the total weight of the polymer a), are ones having one or more substituents selected from the group consisting of aldehyde, keto, epoxide, isocyanate, carboxylic anhydride and aziridine groups,
   b) from 5 to 70 parts by weight of one or more water-soluble, film-forming polymers, where the parts by weight of a) and b) add up to 100 parts by weight, and
   c) one or more compounds containing at least two functional groups which are present in salt form and are selected from the group consisting of amines, hydrazides, hydroxylamine esters, aryl- and alkylhydrazines or -hydrazones.

2. A crosslinkable powder composition which is redispersible in water as claimed in claim 1, comprising as polymer a) polymers comprising one or more monomer units selected from the group consisting of vinyl esters of unbranched or branched alkylcarboxylic acids having from 1 to 15 carbon atoms, methacrylic and acrylic esters of unbranched or branched alcohols having from 1 to 12 carbon atoms, fumaric and maleic monoesters or diesters of unbranched or branched alcohols having from 1 to 12 carbon atoms, dienes, olefins, vinylaromatics and vinyl halides.

3. A crosslinkable powder composition which is redispersible in water as claimed in claim 1, wherein the polymer a) comprises one or more monomer units selected from the group consisting of acrolein, vinyl methyl ketone, allyl acetoacetate, vinyl acetoacetate, vinyl or allyl bisacetoacetate and acetoacetylated hydroxyalkyl (meth)acrylates, glycidyl acrylate, glycidyl methacrylate, glycidyl vinyl ether, glycidyl allyl ether, meta- and para-isopropenyl-alpha,alpha-dimethylbenzyl isocyanate (TMI), 2-methyl-2- isocyanatopropyl methacrylate, allylsuccinic anhydride and maleic anhydride.

4. A crosslinkable powder composition which is redispersible in water as claimed in claim 1, wherein a water-soluble protective colloid is used as polymer b).

5. A crosslinkable powder composition which is redispersible in water as claimed in claim 1, comprising as component c) a compound selected from the group consisting of halides, in particular fluorides, sulfates, phosphates, carbonates, acetates and formates of hexamethylenediamine, triethylenetetramine, carbodihydrazide and the dihydrazides of aliphatic and alicyclic dicarboxylic acids or of hexahydroterephthalic acid.

6. A powdered building material in the dry state and which requires the addition of water to render it useful for its intended purpose, said powdered building-material containing as a component thereof, the crosslinkable powder composition as claimed in claim 1.

7. The powdered building material of claim 12 which is mortar.

8. The powdered building material of claim 12 which is a plaster.

9. A powdered binder material in the day state and which requires the addition of water to render it useful for its intended purpose, said powdered binder containing as a component thereof the crosslinkable powder compositions as claimed in claim 1.

* * * * *